United States Patent
He

(10) Patent No.: US 8,434,094 B2
(45) Date of Patent: Apr. 30, 2013

(54) METHOD AND APPARATUS FOR IMPLEMENTING A PREDETERMINED OPERATION IN DEVICE MANAGEMENT

(75) Inventor: Jiangshui He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1133 days.

(21) Appl. No.: 12/004,048

(22) Filed: Dec. 20, 2007

(65) Prior Publication Data

US 2008/0163262 A1  Jul. 3, 2008

Related U.S. Application Data

(63) Continuation of application No. PCT/CN2006/001449, filed on Jun. 26, 2006.

(30) Foreign Application Priority Data

Jun. 30, 2005 (CN) .......................... 2005 1 0080257

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ........... 719/313; 719/315; 719/317; 717/120; 717/124

(58) Field of Classification Search .................. None
See application file for complete search history.

(56) References Cited

U.S. PATENT DOCUMENTS

| | | | |
|---|---|---|---|
| 5,946,304 A * | 8/1999 | Chapman et al. | 370/276 |
| 6,314,434 B1 * | 11/2001 | Shigemi et al. | 707/695 |
| 6,918,006 B1 | 7/2005 | Archibald, Jr. et al. | |
| 7,046,997 B2 | 5/2006 | Bahr | |
| 7,047,448 B2 | 5/2006 | Rao et al. | |
| 7,499,950 B2 | 3/2009 | Draluk et al. | |
| 7,523,155 B2 | 4/2009 | Hayes, Jr. | |
| 2002/0112047 A1 | 8/2002 | Kushwaha et al. | |
| 2003/0105986 A1 | 6/2003 | Elko et al. | |

(Continued)

FOREIGN PATENT DOCUMENTS

| | | |
|---|---|---|
| CN | 1543251 | 11/2004 |
| CN | 1555521 | 12/2004 |

(Continued)

OTHER PUBLICATIONS

Open Mobile Alliance, DRM Specification V2.0 Draft Version 2.0, Apr. 20, 2004, Open Mobile Alliance.*

(Continued)

*Primary Examiner* — Andy Ho
*Assistant Examiner* — Craig Dorais
(74) *Attorney, Agent, or Firm* — Slater & Matsil, L.L.P.

(57) ABSTRACT

A method for implementing a predetermined operation in device management, being based on a DM system defined by OMA, includes: sending by the device management system a second predetermined operation based on a trigger condition to a terminal device and storing by the terminal device the received predetermined operation; and obtaining by the terminal device from itself the second predetermined operation and executing the second predetermined operation when the trigger condition is satisfied. The present invention also discloses an apparatus for implementing a predetermined operation in device management.

12 Claims, 8 Drawing Sheets

U.S. PATENT DOCUMENTS

| | | | |
|---|---|---|---|
| 2003/0139175 | A1 | 7/2003 | Kim |
| 2004/0103412 | A1 | 5/2004 | Rao et al. |
| 2004/0203686 | A1 | 10/2004 | Bahr |
| 2005/0055397 | A1 | 3/2005 | Zhu et al. |
| 2005/0060361 | A1 | 3/2005 | Chatrath et al. |
| 2005/0172162 | A1 | 8/2005 | Takahashi et al. |
| 2005/0228847 | A1 | 10/2005 | Hayes, Jr. |
| 2006/0212558 | A1 | 9/2006 | Sahinoja et al. |
| 2006/0230395 | A1 | 10/2006 | Paul et al. |
| 2007/0165654 | A1 | 7/2007 | Chai et al. |
| 2009/0064341 | A1 | 3/2009 | Hartung et al. |

FOREIGN PATENT DOCUMENTS

| | | |
|---|---|---|
| CN | 1570875 A | 1/2005 |
| CN | 1801743 A | 7/2006 |
| EP | 1 435 573 A2 | 7/2004 |
| EP | 1 473 873 A2 | 11/2004 |
| EP | 1517566 | 3/2005 |
| GB | 2341774 | 3/2000 |
| WO | WO 03/041422 A2 | 5/2003 |
| WO | WO 2004/111785 | 12/2004 |

OTHER PUBLICATIONS

English language Written Opinion of PCT/CN2006/001449, mailed Oct. 26, 2006 (4 pages).

First Chinese Office Action of CN 200510080257.3 mailed Jan. 4, 2008 (22 pages).

SnycML Device Management Bootstrap, version 1.1.2, Open Mobile Alliance, Dec. 9, 2003 (24 pages).

SnycML Device Management Protocol, version 1.1.2, Open Mobile Alliance, Dec. 12, 2003 (7 pages).

EP Application No. 06 761 318.2: Communication dated Sep. 18, 2008 (4 pages).

EP Application No. 06 761 318.2: Communication dated Feb. 17, 2009 (4 pages).

EP Application No. 06 761 318.2: Summons to attend oral proceedings, dated Aug. 24, 2009 (5 pages).

International Search Report from the Chinese Patent Office for International Application No. PCT/CN2006/001449 (Sep. 18, 2006).

Open Mobile Alliance, "Trap Management Object for Fault/Performance Event Reporting," Open Mobile Alliance, Draft Version 1.3, OMA-DM-Trap V1.3 2004 10 25, Sep. 28, 2004, 17 pages.

Korean Office Action (english translation), Korean Application No. 10-2008-7001731, Applicant: Huawei Technologies Co., Ltd., Date of transmission: Mar. 9, 2010, 3 pages.

Wetherall et al.; "ANTS: A Toolkit for Building and Dynamically Deploying Network Protocols"; IEEE Open Architectures and Network Programming, pp. 117-129, (Apr. 3, 1998).

Soriano et al.; "Delivering Mobile Enterprise Services on Morfeo'S MC Open Source Platform"; International Conference on Mobile Data Management (MDM); pp. 1-8, (2006).

"OMA Device Management Protocol, Draft Version 1.2"; Open Mobile Alliance (OMA), pp. 1-49, (Apr. 28, 2005).

Extended European search report including supplementary European search report and European search opinion from the European Patent Office for European Application No. EP 06 76 1318, (Jun. 2, 2008).

\* cited by examiner

METHOD AND APPARATUS FOR IMPLEMENTING A PREDETERMINED OPERATION IN DEVICE MANAGEMENT

CROSS-REFERENCE TO RELATED APPLICATIONS

The present application is a continuation of PCT Application No. PCT/CN2006/001449, filed on Jun. 26, 2006, which claims a priority to Chinese Patent Application No. 200510080257.3, filed on Jun. 30, 2005. All of these applications are incorporated herein by reference for all purposes.

FIELD OF THE INVENTION

The present invention relates to device management technologies in the communication field, and more particularly to a method and an apparatus for implementing a predetermined operation in device management.

BACKGROUND OF THE INVENTION

Mobile terminals are an important part in the whole mobile operating and serving system. With the more and more complex terminal functions, the probability that problems occur in software of the terminals increases prominently. As the competition between operators will become fiercer and fiercer in the future, how to effectively assure users' experience, improve users' loyalty, keep efficient quality of service and low-cost device maintenance has become an important concern for the operators and terminal vendors.

An event trigger mechanism has been defined in an existing Open Mobile Alliance Device Management (OMA DM) specification, which is mainly used in the case that when a Device Management (DM) service delivers a diagnosing or fault reporting task and then a terminal makes a diagnosis or a fault occurs, the terminal sends a diagnostic result or fault reports collected by the terminal back to the server. This event trigger mechanism is limited to the reporting of diagnostic results or fault reports from the terminal to the server, but the terminal does not carry out any other operations.

In an existing solution, an approach of Trap Management Object (Trap MO) is provided for diagnosis and fault tracking and reporting running on the terminal. This Trap MO provides two kinds of trigger mechanisms, i.e. time-based trigger mechanism and event-based trigger mechanism. When a device management server delivers a diagnosing or fault tracking operation, the operation is delivered in a form of a Trap MO and the Trap MO contains parameters related to the diagnosing or fault reporting. After collecting the diagnostic data or fault reports, a DM agent reports the collected diagnostic data or fault reports to the DM server upon the occurrence of a trigger condition. FIG. 1 shows a specific processing procedure.

In process 1, the DM server delivers a diagnosing or fault tracking operation in a form of a Trap MO.

In process 2, the DM agent in a terminal device collects diagnostic data or fault reports.

In process 3, the trigger condition occurs, and the DM agent executes a triggered operation.

In process 4, the DM agent sends the diagnostic data or fault tracking reports to the DM server.

The format of a Trap MO provided in the existing OMA DM protocol is shown in FIG. 2.

In this figure, TrapID is a unique identifier identifying the Trap MO.

The leaf node CM indicates data collection policies for the Trap MO.

The leaf node Result stores diagnostic data or fault reports to be reported to the DM server.

The leaf node ServerID identifies the DM server to which the DM agent will send diagnostic data or fault tracking reports The leaf node Enable acts as a switch of a Trap for controlling whether to enable the Trap.

Reporting/Type is adapted to indicate whether the Trap MO is time (TM)-triggered or event (EV)-triggered.

The value of the leaf node Reporting/Value is adapted to, if the Trap MO is time-triggered, indicate the interval at which the collected diagnostic data or fault reports are sent to the server, or if the Trap MO is event-triggered, indicate how many times the event occurs when the diagnostic data or fault reports are sent to the server.

TrapRef corresponds to other Trap MOs that may be referenced by this Trap MO, and a TrapRef is used here to refer to the referenced Trap MO.

Although the existing OMA DM trigger mechanism provides the two different mechanisms, time-based trigger mechanism and event-based trigger mechanism, it has drawbacks as follows.

1. The function performed by the terminal is limited to the reporting to the server when the trigger condition is satisfied, resulting in great limitation in application.

2. It is impossible to recover from the failure or make a backup automatically when an abnormal condition such as a failure or a fault occurs on the terminal.

SUMMARY OF THE INVENTION

The present invention provides a method and an apparatus for implementing a predetermined operation in device management, so as to address the limitation in the prior art that the terminal device performs only the reporting operation.

The technical solutions for implementing the present invention are described as follows.

A method for implementing a predetermined operation in device management, being based on a Device Management (DM) system defined by Open Mobile Alliance (OMA), includes:

sending a second predetermined operation based on a trigger condition to a terminal device and storing the received second predetermined operation; and obtaining from the terminal device the second predetermined operation and executing the second predetermined operation when the trigger condition is satisfied.

Optionally, the storing the received second predetermined operation includes: storing the received second predetermined operation into a Trap management object in a form of an executable node; and the obtaining the second predetermined operation and executing the second predetermined operation includes: obtaining the executable node from the Trap management object and executing the second predetermined operation.

Optionally, the storing the received second predetermined operation includes: storing a path name of an executable script file for the received second predetermined operation into a leaf node in a Trap management object; and the obtaining the second predetermined operation and executing the second predetermined operation includes: obtaining the path name of the executable script file from the leaf node and executing the script file directed by the path name so as to execute the second predetermined operation.

Optionally, the storing the received second predetermined operation device includes: storing the received second predetermined operation into a leaf node in a Trap management object in a form of extensible markup language; and the obtaining the second predetermined operation and executing the second predetermined operation includes: obtaining a value of the leaf node and making an extensible markup language parsing, and executing the second predetermined operation.

Optionally, the storing the received second predetermined operation includes: storing the received second predetermined operation into a leaf node in a Trap management object in a form of a uniform resource identifier; and the obtaining the second predetermined operation and executing the second predetermined operation includes: reading the uniform resource identifier from the leaf node and obtaining a management object corresponding to the uniform resource identifier, and executing an operation of the management object so as to execute the second predetermined operation.

Optionally, the storing the received second predetermined operation includes: storing the received second predetermined operation into a leaf node in a Trap management object in a form of a unique predetermined operation identifier; and the obtaining the second predetermined operation and executing the second predetermined operation includes: obtaining the unique predetermined operation identifier from the leaf node and executing an operation directed by the unique predetermined operation identifier so as to execute the second predetermined operation.

Optionally, the second predetermined operation is stored in a Trap management object in a form of an executable node.

Optionally, the second predetermined operation is presented in a form of a tree structure or an executable node, and is associated with a Trap management object in the terminal device by means of a predefined association identifier; and the second predetermined operation and the association identifier belong to a same parent node.

Optionally, the second predetermined operation is presented in a form of a tree structure, and is associated with a Trap management object in the terminal device by means of a predefined association identifier; and the association identifier is located in a node on a tree where the second predetermined operation resides.

Optionally, the predefined association identifier is a unique identifier TrapID of the Trap management object in the terminal device.

Optionally, the second predetermined operation includes maintenance processing to be implemented.

Optionally, the maintenance processing includes failure repair and/or data backup.

Optionally, the method further includes reporting a result of the second predetermined operation to the device management server after executing the second predetermined operation.

Optionally, when the trigger condition occurs, the method further includes executing a first predetermined operation.

Optionally, the first predetermined operation includes reporting diagnostic and/or fault information to a device management server.

Optionally, the trigger condition includes event trigger condition and time trigger condition.

An apparatus for implementing a predetermined operation in device management, being applicable to a terminal device, wherein the apparatus includes a predetermined operation receiving module, a predetermined operation executing module and a monitoring module, and wherein the predetermined operation receiving module is adapted to receive a second predetermined operation based on a trigger condition sent by a device management server and store the second predetermined operation based on the trigger condition into the storing module;

the monitoring module is adapted to monitor whether the trigger condition is satisfied and notify the predetermined operation executing module when the trigger condition is satisfied; and the predetermined operation executing module is adapted to obtain and execute the second predetermined operation from the storing module according to a received notification.

Optionally, the apparatus further includes a storing module adapted to store the second predetermined operation and the trigger condition.

Optionally, the predetermined operation receiving module is further adapted to receive a first predetermined operation based on a trigger condition sent from the device management server and storing the first predetermined operation based on the trigger condition into the storing module;

the storing module is further adapted to store the first predetermined operation; and the predetermined operation executing module is further adapted to obtain the first predetermined operation from the storing module and execute the obtained first predetermined operation according to a received notification.

A method for implementing a predetermined operation in device management in a terminal device, being based on a device management system defined by Open Mobile Alliance, wherein the method includes:

receiving a second predetermined operation based on a trigger condition and storing the received second predetermined operation; and obtaining the second predetermined operation and executing the second predetermined operation when the trigger condition is satisfied.

The present invention provides the advantages as follows.

1. Function mechanism of a MO is extended so that operations for different functions may be triggered to be executed upon the occurrence of the trigger condition. Especially for function mechanism of a Trap MO, the terminal device is not limited to the function of reporting diagnostic data and fault reports to the DM server.

2. When the terminal device can't operate normally due to a failure or a fault, the terminal device can execute a predetermined operation delivered from the DM server so as to recover from the abnormal condition, thereby providing a fault tolerance mechanism.

3. By applying the present invention based on the above fault tolerance mechanism, the workload for the operator to maintain terminals may be reduced and the terminal devices may recover from abnormal conditions timely, thereby improving the users' loyalty.

DETAILED DESCRIPTION OF THE EMBODIMENTS

A key principle of the present invention lies in that a device management server sends a second predetermined operation based on a trigger condition to a terminal device, the terminal device stores the received second predetermined operation, and the terminal device obtains from itself and executes the second predetermined operation. The second predetermined operation includes but not limited to maintenance processing to be implemented locally by the terminal device, such as failure repair and/or data backup. The terminal device may report a result of the second predetermined operation to the device management server after implementing the second predetermined operation. The trigger condition mentioned above includes but not limited to an event trigger condition or a time trigger condition.

In addition, the terminal device may further execute a first predetermined operation. The first predetermined operation includes but not limited to reporting of diagnostic and/or fault information by the terminal device to the device management server.

In this way, when a failure or fault occurs, not only the first predetermined operation may be performed to report information to the server, but also the second predetermined operation may be performed for making a maintenance processing timely. For example, when a terminal device can't operate normally due to a failure, the terminal device executes by itself a second predetermined operation sent from the server to make a failure repair and data backup for the terminal in addition to executing a first predetermined operation to report data to the device management server, instead of simply reporting information by a DM agent module on the terminal device to the DM server as in the prior art.

A predetermined operation may be presented on the management tree of the device in the following five approaches.

1. Executable Node

Figure 1:
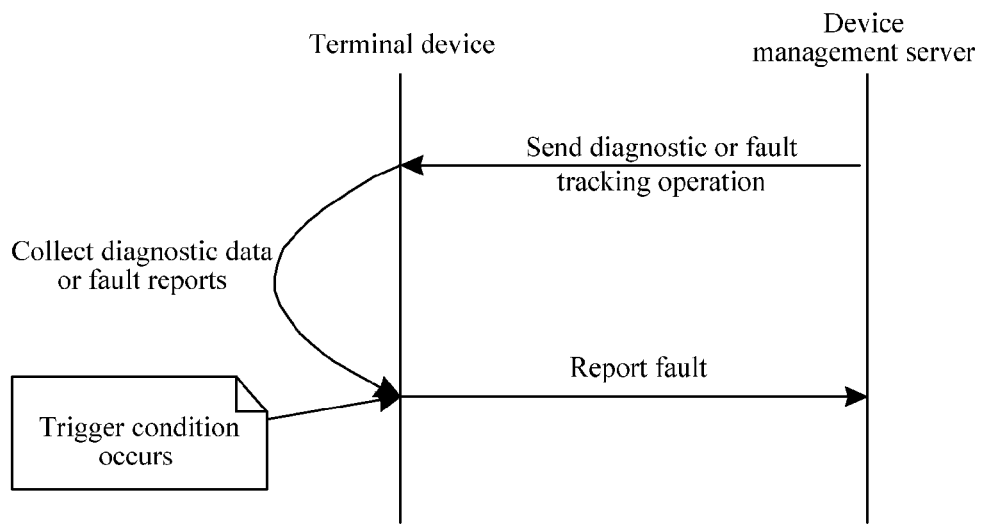
FIG. 1 is a flow chart illustrating the fault reporting in the prior art.
Figure 2:
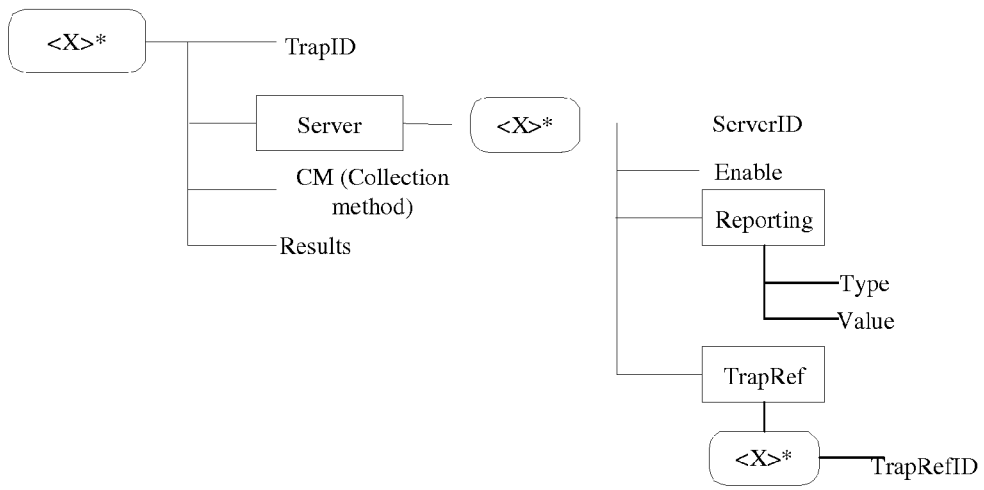
FIG. 2 is a schematic diagram illustrating the format of a Trap MO specified in the OMA DM specification in the prior art.
Figure 3A:
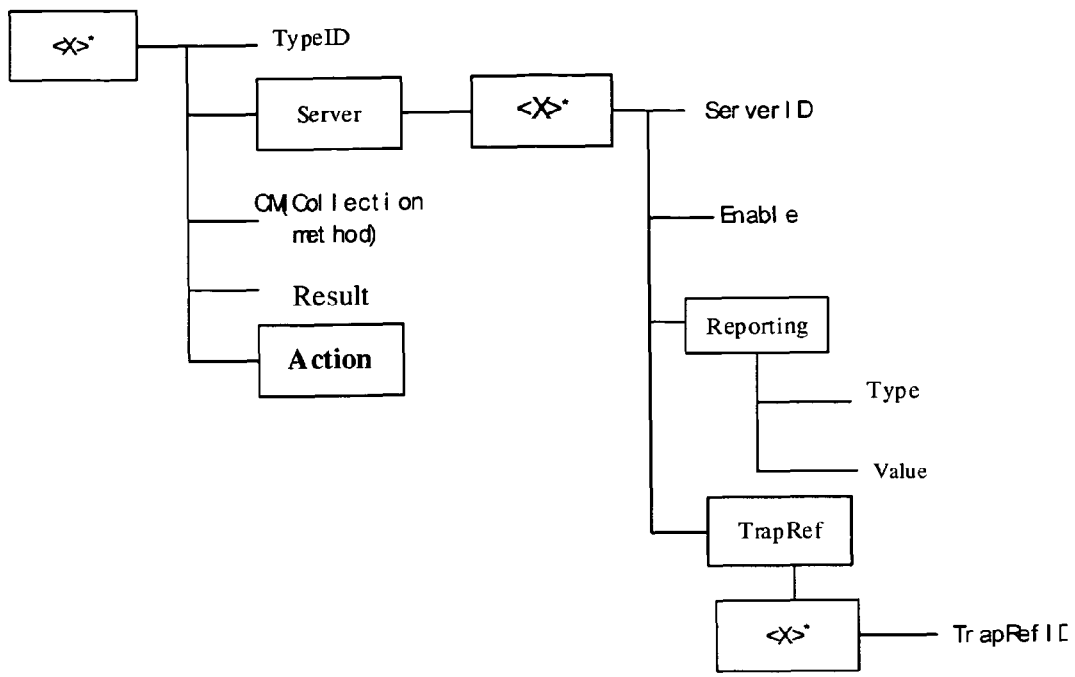
FIGS. 3A, 3B, 3C, 3D and 3E are schematic diagrams illustrating the presenting of a predetermined operation on a management tree of a device according to an embodiment of the present invention.

The second predetermined operation sent from the DM server may be directly attached to the management tree in a form of an executable node. As shown in FIG. 3A, the leaf node Action is defined as the second predetermined operation sent from the DM server. This Leaf node Action is directly attached to the management tree as an executable node, and may be directly executed by an Exec command to perform an operation upon the occurrence of the trigger condition. An example of the Exec command is illustrated as below.

```
<Exec>
    <CmdID>2</CmdID>
    <Item>
        <Target>
            <LocURI>/MalFuntion/Action </LocURI><!-- Enable triggering and executing the action upon occurrence of a failure -->
        </Target>
    </Item>
</Exec>
```

2. Path Name

Figure 3B:
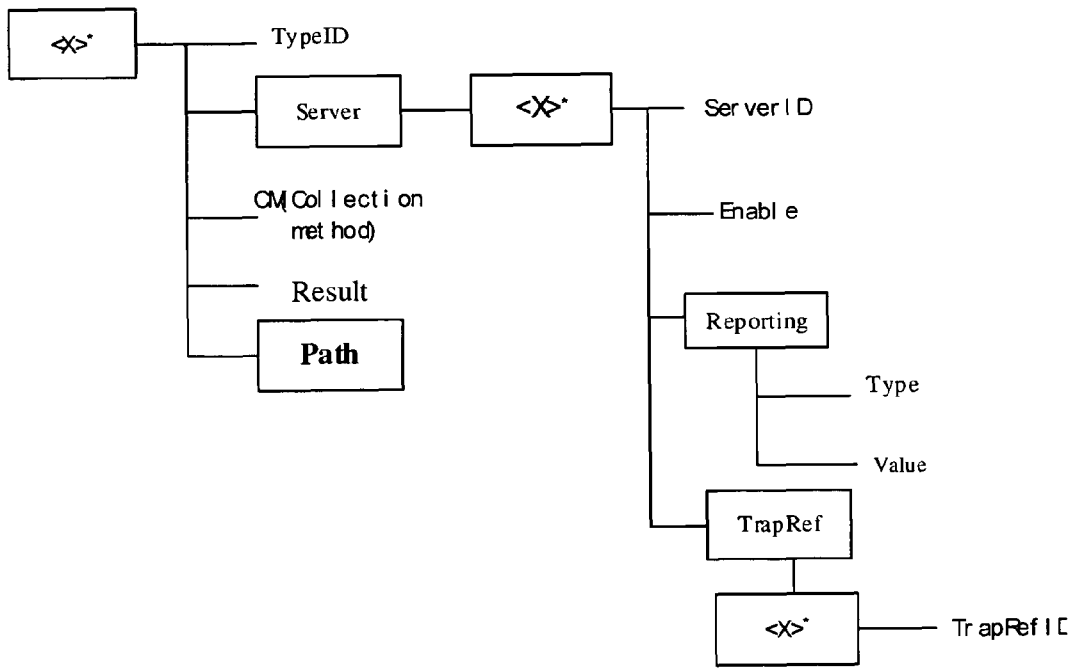

The path name of an executable script file for the second predetermined operation is stored on the management tree as a value of a leaf node. The DM agent executes the file indicated by the path name upon the occurrence of the trigger condition. As shown in FIG. 3B, the leaf node Path in the Trap MO structure stores the path name of a script file for the second predetermined operation. When the trigger condition occurs, the DM agent reads the path name of the script file for the second predetermined operation and executes the script file with an Exec command, thus implementing the trigger mechanism. An example of the Exec command is illustrated as follows.

```
<Exec>
    <CmdID>2</CmdID>
    <Item>
        <Target>
            <LocURI>/MalFuntion/Path </LocURI><!-- Enable triggering and executing the action upon occurrence of a failure -->
        </Target>
    </Item>
</Exec>
```

3. Textual Information in Extensible Markup Language (XML) Stored in a Node

Figure 3C:
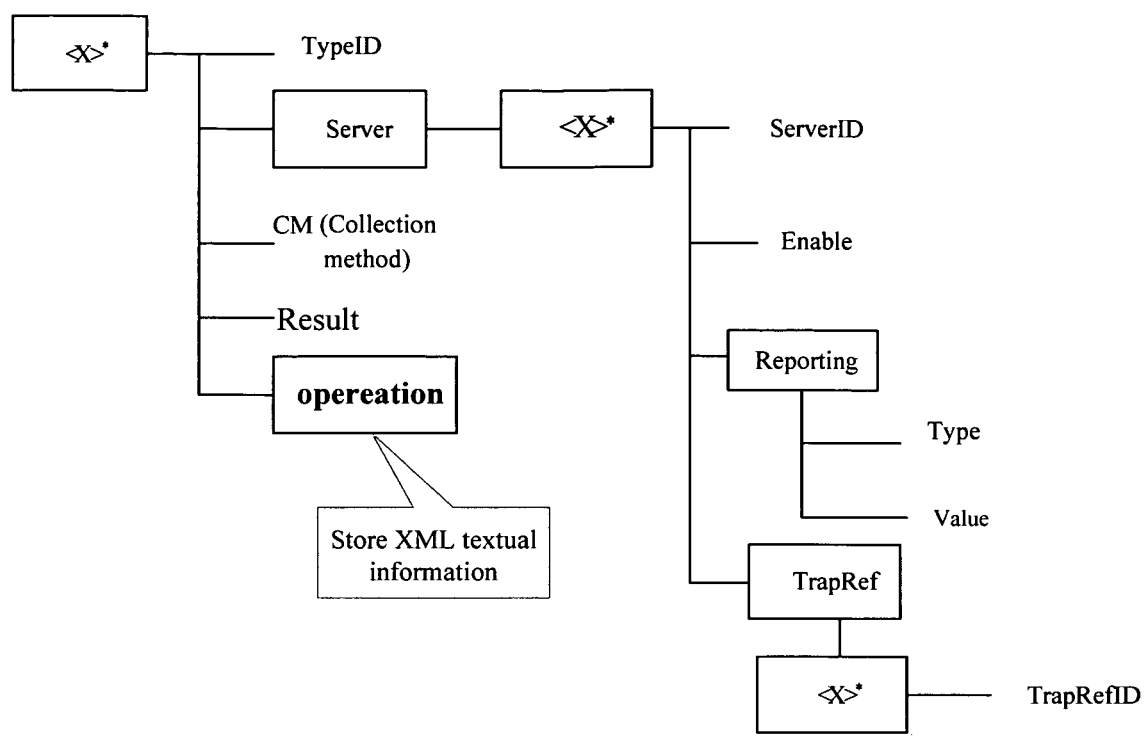

The second predetermined operation sent from the DM server may be directly stored in a node in a form of XML textual information. This operation may be sent to the management tree along with a Trap by the DM server, and may be executed by executing the value of the node with an Exec command upon the occurrence of the trigger condition. This construction is shown in FIG. 3C. When the trigger condition occurs, the second predetermined operation is executed through making an XML parsing on the value of the leaf node Operation.

If the XML description of the predetermined operation is executed with an Exec command upon the occurrence of the trigger condition, the attributes of the Operation node are illustrated as below.

| Tree Occurrence | Format | Min Access Right |
| --- | --- | --- |
| ZeroOrMore | CData | Get, Exec |

4. Uniform Resource Identifier (URI) Stored in a Node

Figure 3D:
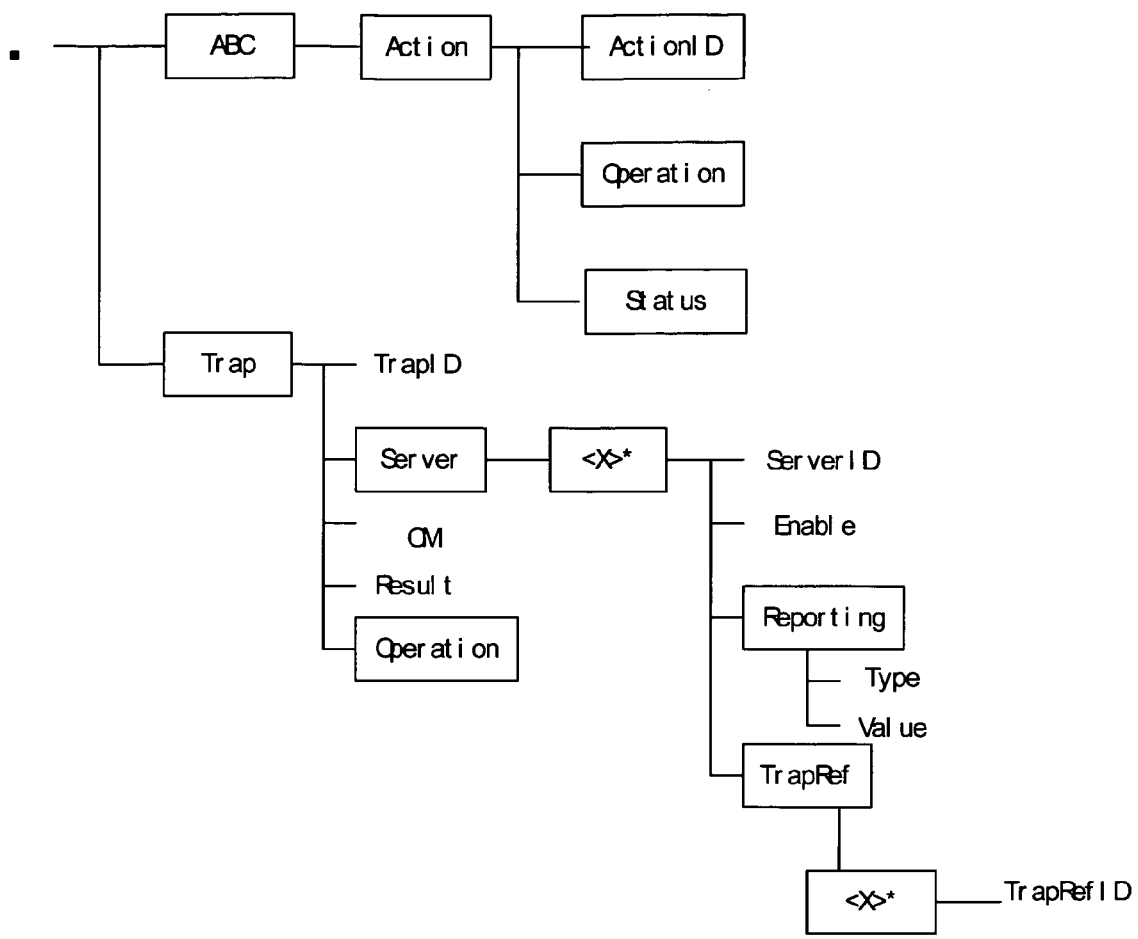

The second predetermined operation sent from the DM server may be directly stored in a node in a form of a URI. This operation may be sent to the management tree along with a Trap by the DM server, and may be executed by executing the value of the node with an Exec command upon the occurrence of the trigger condition. This construction is shown in FIG. 3D. When the trigger condition occurs, the second predetermined operation is retrieved by means of the value of the leaf node Operation indicating the operation and then is executed.

For the construction in FIG. 3D, the Operation node stores the predetermined operation to be executed upon the occurrence of the trigger condition, and has a format as follows.

| Tree Occurrence | Format | Min. Access Types |
| --- | --- | --- |
| Zero Or More | chr | Get |

If the value of the Operation node is ./ABC/Action, it indicates that when the trigger condition is satisfied, a predetermined operation indicated by the URI will be triggered to implement the task sent in advance by the DM server. The corresponding command is illustrated as below.

```
<MgmtTree>
    <Node>
        <NodeName>.</NodeName>
        <DFProperties>...</DFProperties>
        <Node>
            <NodeName>Trap</NodeName>
            <DFProperties>...</DFProperties>
            <Node>
                <NodeName>Operation</NodeName>
                <DFProperties>...</DFProperties>
                <Value>./ABC/Action</Value> -- the value of the
node, which indicates the predetermined operation to be executed when
the trigger condition is satisfied --
            </Node>
        </Node>
    </Node>
</MgmtTree>
```

5. Unique Predetermined Operation Identifier Stored in a Node

Figure 3E:
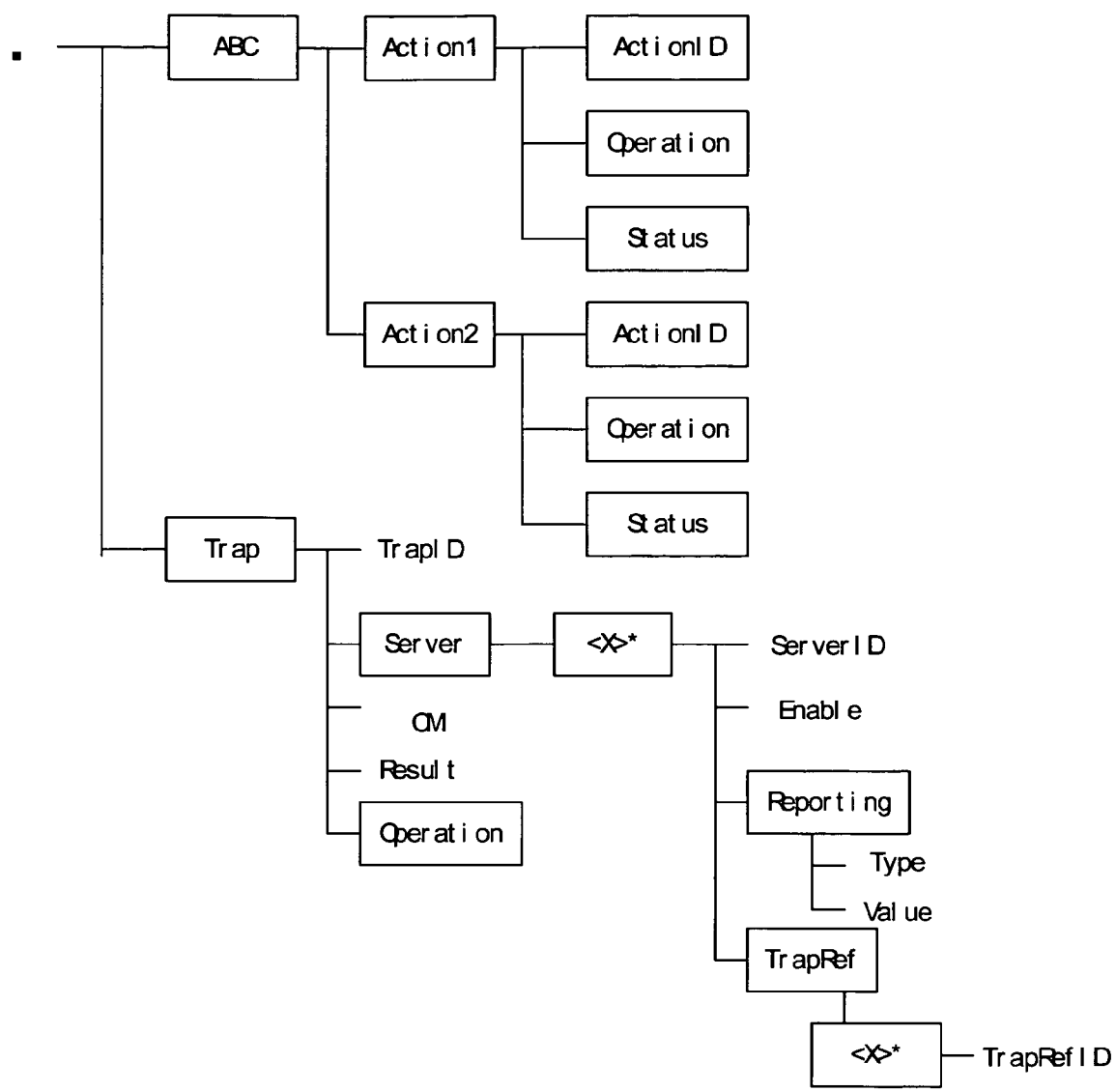

The second predetermined operation sent by the DM server may be directly stored in a node in a form of a unique predetermined operation identifier. This operation may be sent to the management tree along with a Trap by the DM server. Each predetermined operation corresponds to a unique predetermined operation identifier. The DM server associates the trigger condition with the unique predetermined operation identifier of the predetermined operation. In this way, the terminal device may trigger the predetermined operation sent from the DM server by means of the unique predetermined operation identifier when the trigger condition occurs. This construction is shown in FIG. 3E. When the trigger condition occurs, the second predetermined operation is retrieved by means of the value of the leaf node Operation indicating the operation and then is executed.

With reference to FIG. 3E, the node ./ABC/Action1/Action ID denotes a unique predetermined operation identifier identifying a predetermined operation. Each predetermined operation corresponds to a unique predetermined operation identifier. The corresponding command is illustrated as below.

```
<MgmtTree>
    <Node>
        <NodeName>.</NodeName>
        <DFProperties>...</DFProperties>
        <Node>
            <NodeName>ABC</NodeName>
            <DFProperties>...</DFProperties>
            <Node>
                <NodeName>Action1</NodeName>
                <DFProperties>...</DFProperties>
                <Node>
                    <NodeName>ActionID</NodeName>
                    <DFProperties>...</DFProperties>
                    <Value>1234</Value> -- the value of the node,
which indicates the unique identifier identifying the predetermined
operation to be executed when the trigger condition is satisfied --
                </Node>
            </Node>
        </Node>
    </Node>
</MgmtTree>
```

The above XML description shows that those predetermined operations are distinguished from each other by a unique identifier, for example, 1234 in the above example.

```
<MgmtTree>
    <Node>
        <NodeName>.</NodeName>
        <DFProperties>...</DFProperties>
        <Node>
            <NodeName>Trap</NodeName>
            <DFProperties>...</DFProperties>
            <Node>
                <NodeName>Operation</NodeName>
                <DFProperties>...</DFProperties>
                <Value>1234</Value> -- the value of the node,
which indicates the unique identifier identifying the predetermined
operation to be executed when the trigger condition is satisfied --
            </Node>
        </Node>
    </Node>
</MgmtTree>
```

The Operation node in the Trap MO stores a unique identifier identifying a predetermined operation to be executed when the trigger condition is satisfied. With this unique identifier, the client may execute the predetermined operation sent from the server when the trigger condition is satisfied.

The predetermined operations may be managed on the terminal device in the construction approaches as below.

Figure 4A:
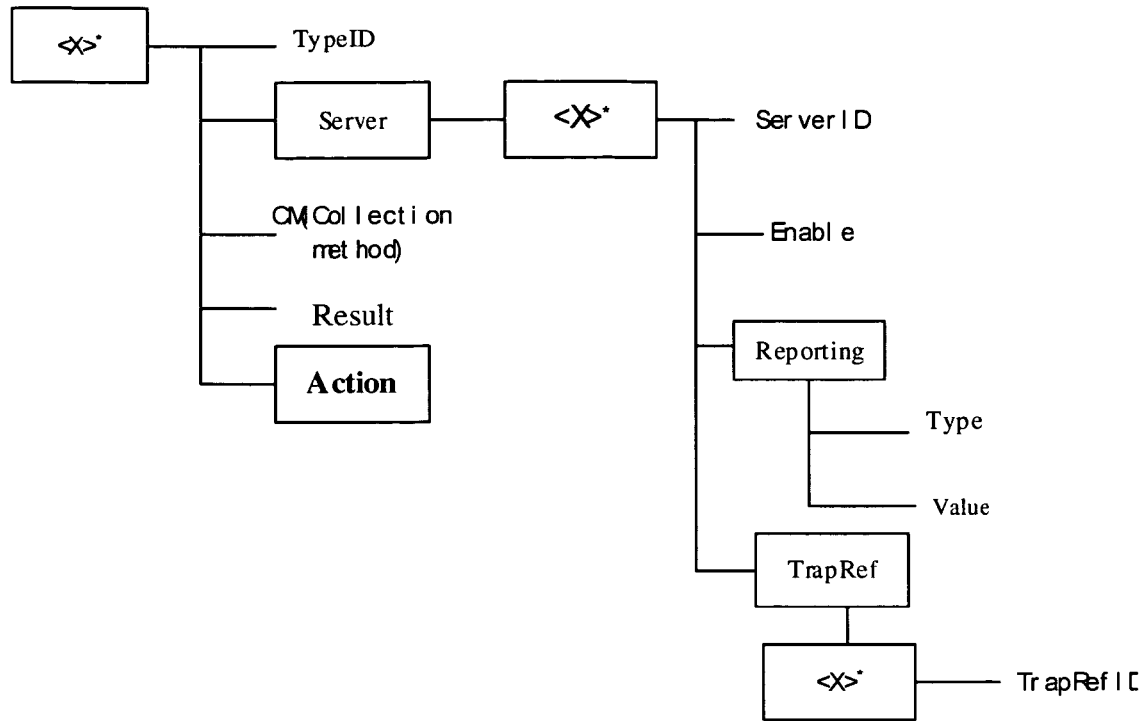
FIGS. 4A, 4B and 4C are schematic construction diagrams illustrating a predetermined operation according to an embodiment of the present invention.

1. To extend functions for the trigger mechanism without a big change in the existing Trap MO, an executable node defining the second determined operation, for example an executable node Action, may be added to the existing Trap MO, so that the DM agent may be triggered to execute the second determined operation upon the occurrence of the trigger condition. The structure of the Trap MO is shown in FIG. 4A, in which the Action node denotes the second predetermined operation to be executed by the DM agent upon the occurrence of a fault event. The position at which the Action node is attached to the Trap MO is not limited to that shown in FIG. 4A. In this way, the function that only includes reporting diagnostic results or fault reports is extended for the Trap MO. The DM agent may also send diagnostic data or fault tracking reports to the DM server while executing the second predetermined operation sent from the DM server, but is not limited to this by extension. When the leaf node Result is empty, the DM agent does not send diagnostic data or fault tracking reports to the DM server. In other words, the construction approach means that the second predetermined operation may be presented in the Trap MO as an executable node.

For example, when the trigger condition occurs, the Action operation may be triggered and executed with an Exec command. An example of the Exec command is illustrated as below.

```
<Exec>
    <CmdID>2</CmdID>
    <Item>
        <Target>
            <LocURI>/MalFuntion/Action </LocURI><!-- Enable
triggering and executing the action upon occurrence of a failure -->
        </Target>
    </Item>
</Exec>
```

2. For not changing the structure of the existing Trap MO, an MO structure as shown in FIG. 4B may be utilized to manage the second predetermined operation.

Figure 4B:
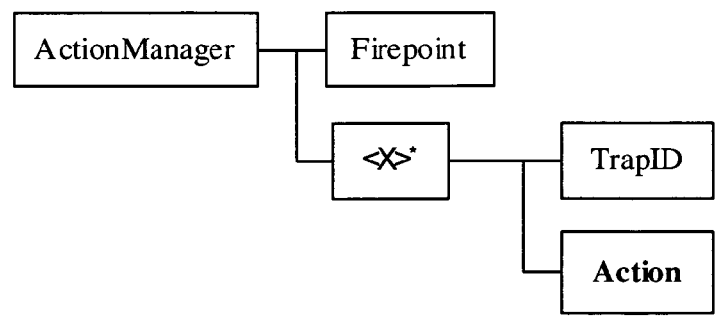

In FIG. 4B, the ActionManager node is attached to the management tree of the terminal device as an interior node.

The leaf node Firepoint stores a TrapID corresponding to a trigger condition. When the trigger condition is satisfied and an execution of a second predetermined operation sent from the DM server is triggered, the TrapID corresponding to the trigger condition is stored to the leaf node Firepoint.

The leaf node ActionManager/<X>*/TrapID stores a TrapID of a trigger condition. This TrapID corresponds to the TrapID in the Trap MO.

The leaf node ActionManager/<X>*/Action describes the second predetermined operation. This node may be an executable node (as stated above) which may be directly executed by an Exec command.

Through this central management mechanism for triggering operations, when a trigger condition occurs, its TrapID is stored to the Firepoint node. By monitoring the Firepoint node and checking whether the value of the TrapID node under the ActionManager node is identical to the value of the Firepoint node, it is determined whether to execute the predetermined operations from DM Server corresponding to the trigger conditions. In other words, this construction approach means that the second predetermined operation is presented in a form of a tree structure or executable node and is associated with the Trap MO in the terminal device with a predefined association identifier, and the second predetermined operation and the association identifier belong to the same parent node. The predefined association identifier is the unique identifier TrapID of the Trap MO in the terminal device.

3. For not changing the structure of the existing Trap MO, an MO structure as shown in FIG. 4C may be utilized to manage the second predetermined operation.

Figure 4C:
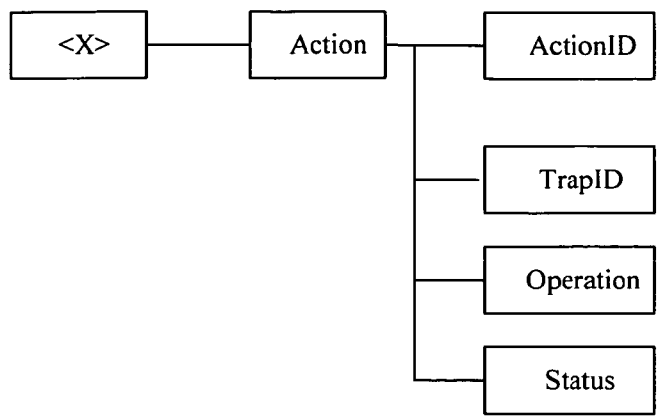

With reference to FIG. 4C, a node for storing a TrapID may be added to the MO for the second predetermined operation. A TrapID denotes an associated Trap MO. In this way, an association is established between the second predetermined operation and the Trap MO. By means of this association, the Trap agent notifies the terminal device to execute a second predetermined operation associated with the TrapID when the trigger condition is satisfied.

In other words, this construction approach means that the second predetermined operation is presented in a form of a tree structure and is associated with the Trap MO in the terminal device by means of a predefined association identifier, and the association identifier is located in a node on the tree where the second predetermined operation resides. The predefined association identifier is the unique identifier TrapID of the Trap MO in the terminal device.

Figure 5:
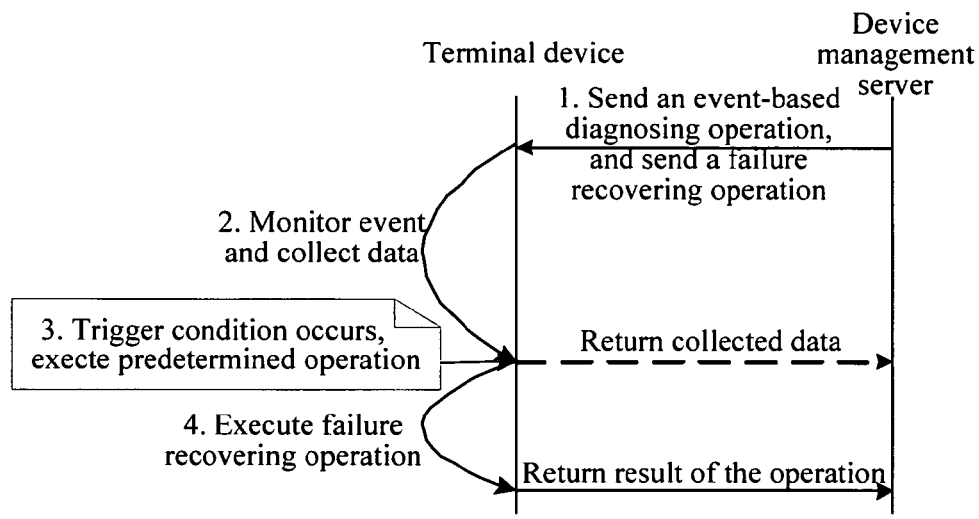
FIGS. 5 and 6 are flow charts illustrating the implementing of a fault event-triggered or time-triggered predetermined operation according to an embodiment of the present invention.

With reference to FIG. 5, a procedure for processing a fault event-triggered predetermined operation is described as below.

In process 1, the DM server delivers an event-triggered diagnosing or fault tracking operation in a form of a Trap MO, and delivers a failure recovery operation (or a data backup operation or other operations) at the same time.

In process 2, the DM agent in the terminal device monitors fault events and collects diagnostic data or fault reports.

In process 3, the fault-triggered event occurs and the terminal can't operate normally due to a failure, the DM agent executes the triggered operation and reports the fault reports on this failure to the DM server.

In process 4, the DM agent executes the failure recovery operation delivered by the DM server and sends a result of the operation to the DM server.

Figure 6:
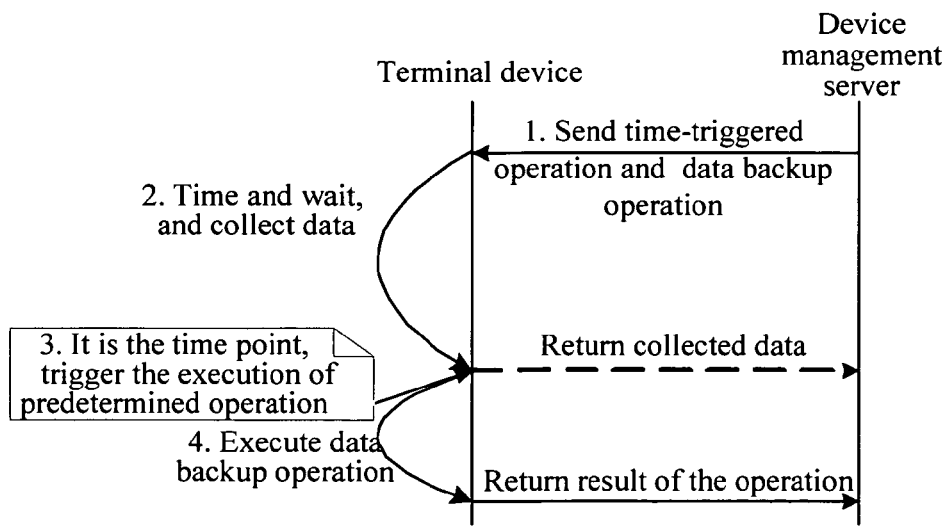

With reference to FIG. 6, a procedure for processing a time-triggered predetermined operation is described as below.

In process 1, the DM server delivers a time-triggered action and a data backup operation.

In process 2, the DM agent in the terminal device detects whether the time trigger condition is satisfied.

In process 3, the time trigger condition is satisfied and the DM agent executes the action, for example, reports the data to the DM server.

In process 4, the DM agent executes a data backup operation and sends a result of the execution of the backup operation to the DM server.

In the above two procedures, there may be only the second predetermined operation, that is, there may be only the failure recovery operation or the data backup operation.

A particular example for implementing the present invention is described as below.

In an operator's network, there are provided a plurality of Wireless Application Protocol (WAP) gateway addresses. If one WAP server address is unable to be accessed, a user who has set this WAP server address can't access the network through WAP. In this case, the WAP gateway server address on the user's terminal may be automatically changed by a delivered predetermined operation. The changed server address may be a default WAP gateway address set by the DM server, and also may be obtained by attempting the other WAP gateway server addresses until one which may be accessed normally is found. The changing of the WAP gateway address on the terminal is executed by the predetermined operation delivered by the DM server.

The server sends a Trap and monitors the WAP accessing in the terminal. When the terminal fails to access the WAP server for two times, a predetermined operation is triggered and executed to automatically change the WAP server address into a spare WAP server address which is preset by the DM server when the Trap is delivered.

A Trap MO delivered by the server has a format as described below.

```
/*------- <X>/Server/<X>*/ServerID -------*/
<Replace>
    <CmdID>1</CmdID>
    <Item>
        <Target>
            <LocURI>/FailGw/Server/scts/ServerID</LocURI>
        </Target>
        <Meta>
            <Format xmlns='syncml:metinf'>chr</Format>
        </Meta>
        <Data>com.openmobilealliance.DMServer</Data>
    </Item>
</Replace>
```

The above XML description indicates the server to which the diagnostic data or fault reports are reported upon the occurrence of the monitored event.

```
/*------- <X>/Server/<X>*/Enabled -------*/
<Replace>
    <CmdID>2</CmdID>
    <Item>
```

-continued

```
    <Target>
        <LocURI>/FailGW/Server/scts/Enabled</LocURI>
    </Target>
    <Meta>
        <Format xmlns='syncml:metinf'>bool</Format>
    </Meta>
    <Data>true</Data>
    </Item>
</Replace>
```

The above XML description indicates the condition monitor is enabled.

```
/*------- <X>/Server/<X>*/Reporting/Type -------*/
<Replace>
    <CmdID>3</CmdID>
    <Item>
        <Target>
            <LocURI>/FailGW/Server/scts/Reporting/Type</LocURI>
        </Target>
        <Meta>
            <Format xmlns='syncml:metinf'>chr</Format>
        </Meta>
        <Data>EV</Data>
    </Item>
</Replace>        //This segment of XML description indicates that
    the trigger condition is an event trigger condition
/*------- <X>/Server/<X>*/Reporting/Value -------*/
<Replace>
    <CmdID>3</CmdID>
    <Item>
        <Target>
            <LocURI>/FailGW/Server/scts/Reporting/Value</LocURI>
        </Target>
        <Meta>
            <Format xmlns='syncml:metinf'>int</Format>
        </Meta>
        <Data>2</Data>
    </Item>
</Replace>        //This segment of XML description indicates that the
predetermined operation is enabled when the monitored event has
occurred for two times.
```

When the trigger condition occurs, i.e. the disposition of passing through the original WAP gateway is not workable, a second predetermined operation as below is executed to repair the failure. The delivered XML description of the second predetermined operation is described as below.

```
<Replace>
    <CmdID>4</CmdID>
    <Item>
        <Target>
            <LocURI>./settings/wap_settings/GW</LocURI>
        </Target>
        <Data> 10.0.0.172</Data>
    </Item>
</Replace>  // This segment of XML description indicates that the
original WAP gateway address is changed to be 10.0.0.172 which is a
spare addressof the WAP gateway of the operator.
```

Figure 7:
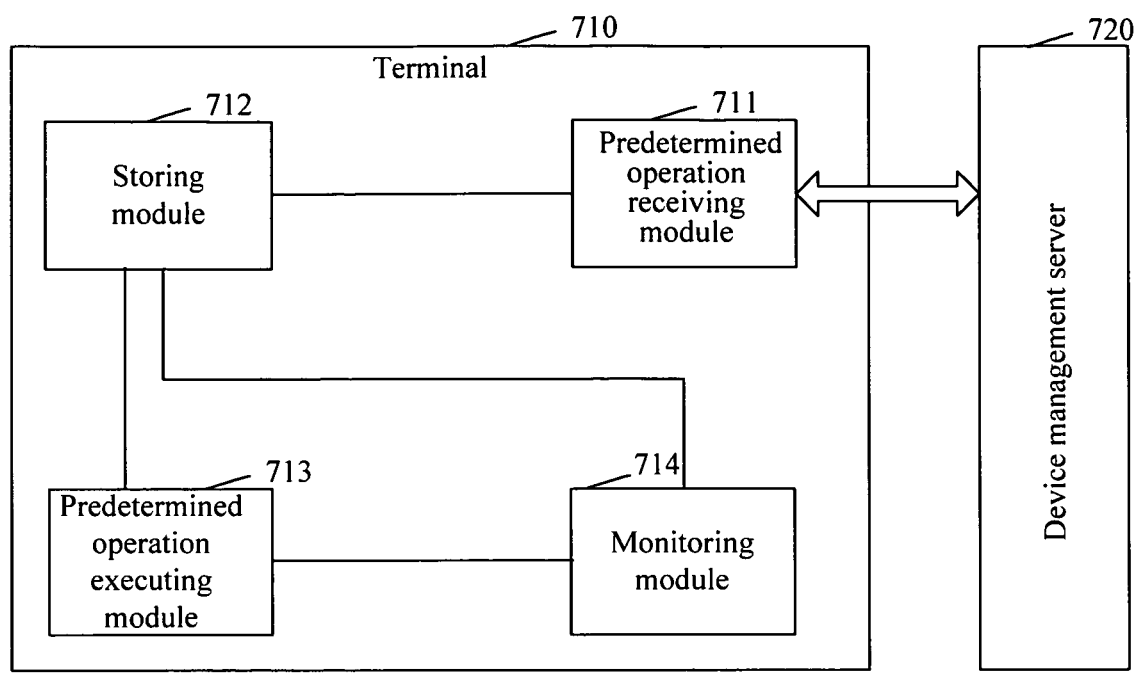
FIG. 7 is a schematic structure diagram illustrating an apparatus according to an embodiment of the present invention.

An apparatus for implementing a predetermined operation in device management is provided in view of the above description. A schematic structure diagram of the apparatus is shown in FIG. 7. This apparatus is located in a terminal 710, and includes a predetermined operation receiving module 711, a storing module 712, a predetermined operation executing module 713 and a monitoring module 714.

The predetermined operation receiving module 711 is adapted to receive a condition-triggered second predetermined operation sent by a device management server 720 and store the condition-triggered second predetermined operation into the storing module 712.

The storing module 712 is adapted to store the second predetermined operation and a predefined trigger condition.

The monitoring module 714 is adapted to monitor whether the trigger condition is satisfied and notify the predetermined operation executing module 713 when the trigger condition is satisfied.

The predetermined operation executing module 713 is adapted to obtain the second predetermined operation from the storing module 712 and executing the obtained second predetermined operation according to the received notification.

In addition, the predetermined operation receiving module 711 may be further adapted to receive a condition-triggered first predetermined operation sent from the device management server 720 and store the first predetermined operation into the storing module 712.

The storing module 712 may be further adapted to store the first predetermined operation.

The predetermined operation executing module 713 may be further adapted to obtain the first predetermined operation from the storing module 712 and execute the obtained first predetermined operation according to the received notification.

The second predetermined operation includes maintenance processing to be implemented locally by the terminal device. The first predetermined operation includes reporting diagnostic result and/or fault reports by the terminal device to the device management server.

In a view from above, the present invention extends the application scenarios of the trigger mechanism, thus a predetermined operation sent from a server may be executed upon the occurrence of a trigger condition. Especially for the mechanism of Trap MO, the terminal device is not limited to reporting information to the server. For example, when the device can't operate normally due to a failure, the terminal device can automatically execute a second predetermined operation delivered from the server so as to recover from the failure or make a data backup, instead of simply reporting the failure information or fault information to the DM server.

It is apparent that a person skilled in the art may make various modifications and verifications on the present invention, without departing from the spirit and scope of the present invention. Thus the present invention intends to cover any of those modifications and verifications.

The invention claimed is:

1. An apparatus for implementing a predetermined operation in device management, being applicable to a terminal device, wherein the apparatus comprises a non-transient computer readable medium with computer executable instructions, that when executed in the apparatus cause the apparatus to perform the following:

receive from a device management server a first predetermined operation for reporting information to the device management server, and the first predetermined operation is based on a trigger condition and is executed by the terminal device when the trigger condition is satisfied, receive a second predetermined operation based on the trigger condition and an identifier of the second predetermined operation sent by the device management server and store the identifier of the received second predetermined operation into the Trap management object, and the second predetermined operation into the management tree outside of the Trap management object based on the trigger condition into a storing module;

monitor whether the trigger condition is satisfied and notify the predetermined operation executing module when the trigger condition is satisfied; and obtain the identifier from the Trap management object and the second predetermined operation corresponding to the identifier from the management tree of the terminal device and execute the second predetermined operation from the storing module according to a received notification.

2. The apparatus according to claim 1, wherein the computer executable instructions when executed in the apparatus cause the apparatus to further perform the following: store the second predetermined operation and the trigger condition.

3. The apparatus according to claim 2, wherein the computer executable instructions when executed in the apparatus cause the apparatus to further perform the following:

store the first predetermined operation based on the trigger condition into the storing module;

store the first predetermined operation; and obtain the first predetermined operation from the storing module and execute the obtained first predetermined operation according to a received notification.

4. A method for implementing a predetermined operation in device management in a terminal device, being based on a device management system defined by Open Mobile Alliance, wherein the terminal device receives a first predetermined operation sent by a device management server for reporting information to the device management server, and the first predetermined operation is based on a trigger condition and is executed by the terminal device when the trigger condition is satisfied, characterized in that the method comprises:

receiving, by the terminal device, a second predetermined operation based on the trigger condition and an identifier of the second predetermined operation;

storing, by the terminal device, the identifier of the received second predetermined operation into the Trap management object, and storing the received second predetermined operation into the management tree outside of the Trap management object; and when the trigger condition is satisfied, obtaining, by the terminal device, the identifier from the Trap management object and the second predetermined operation corresponding to the identifier from the management tree of the terminal device and executing the second predetermined operation.

5. The method according to claim 4, wherein the identifier of the second predetermined operation comprises a path name of an executable script file for the received second predetermined operation; and the obtaining of the identifier from the Trap management object and the second predetermined operation corresponding to the identifier from the management tree of the terminal device and executing the second predetermined operation comprises: obtaining the path name of the executable script file from the leaf node and executing the script file directed by the path name so as to execute the second predetermined operation.

6. The method according to claim 4, wherein the identifier of the second predetermined operation comprises a uniform resource identifier of the second predetermined operation; and the obtaining of the identifier from the Trap management object and the second predetermined operation corresponding to the identifier from the management tree of the terminal device and executing the second predetermined operation comprises: reading the uniform resource identifier from the leaf node and obtaining a management object corresponding to the uniform resource identifier from the management tree of the terminal device, and executing an operation of the management object so as to execute the second predetermined operation.

7. The method according to claim 4, wherein the identifier of the second predetermined operation comprises a unique predetermined operation identifier of the second predetermined operation; and the obtaining of the identifier from the Trap management object and the second predetermined operation corresponding to the identifier from the management tree of the terminal device and executing the second predetermined operation comprises: obtaining the unique predetermined operation identifier from the leaf node and executing an operation directed by the unique predetermined operation identifier so as to execute the second predetermined operation.

8. The method according to claim 4, wherein the second predetermined operation comprises maintenance processing to be implemented.

9. The method according to claim 8, wherein the maintenance processing comprises at least one of failure repair and data backup for the terminal device.

10. The method according to claim 4, further comprising reporting a result of the second predetermined operation to a device management server after executing the second predetermined operation.

11. The method according to claim 4, wherein the first predetermined operation comprises reporting at least one of diagnostic and fault information of the terminal device to a device management server.

12. The method according to claim 4, wherein the trigger condition comprises event trigger condition and time trigger condition.

* * * * *